(No Model.)

O. P. DEEDS.
ANTI CRIBBING ATTACHMENT FOR HORSES.

No. 267,989. Patented Nov. 21, 1882.

Witnesses:
Robert Everett
J. A. Rutherford

Inventor:
Owen P. Deeds.
By James L. Norris.
Atty.

UNITED STATES PATENT OFFICE.

OWEN P. DEEDS, OF CUMRU TOWNSHIP, BERKS COUNTY, ASSIGNOR TO WILLIAM D. GROSS, OF KUTZTOWN, PENNSYLVANIA.

ANTI-CRIBBING ATTACHMENT FOR HORSES.

SPECIFICATION forming part of Letters Patent No. 267,989, dated November 21, 1882.

Application filed May 18, 1882. (No model.)

*To all whom it may concern:*

Be it known that I, OWEN P. DEEDS, a citizen of the United States, residing at Cumru township, in the county of Berks and State of Pennsylvania, have invented new and useful Improvements in Anti-Cribbing Attachments for Horses, of which the following is a specification.

The object of my invention is to provide a device for preventing cribbing or crib-biting, which is a vicious habit of horses, and not only injurious to them but destructive of mangers.

The object of my invention I accomplish by the provision of a longitudinal curved plate of such contour or shape as to accurately conform to the outer surfaces of the upper front teeth of the animal, and provided with suitable means for connecting it with the teeth, said plate having a substantially-straight upper edge adapted to rest immediately beneath the gums, and a rounded lower edge which projects slightly below the edges of the teeth when in position in the animal's mouth, all in such manner that while the animal is free to partake of food without interference from the plate, the latter will prevent the animal cribbing by reason of its lower edge coming in contact with the crib, and thereby causing the upper edge of the plate to bind, press, or operate on the animal's gums sufficiently to cause it to cease its vicious practice and eventually result in a permanent cure of the habit.

Figure 1:
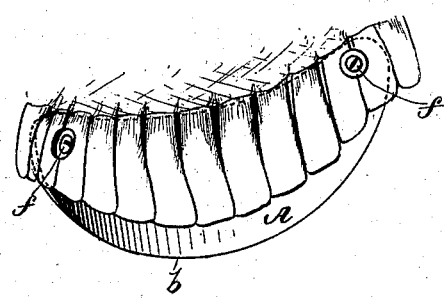
Figure 2:
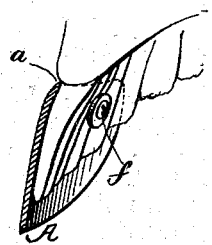
Figure 3:
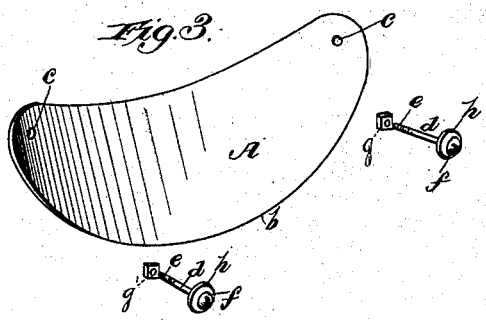
Figure 4:
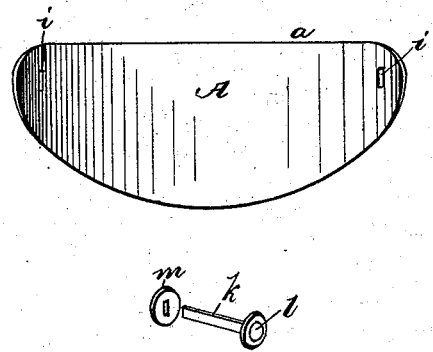

In the accompanying drawings, Figure 1 is a view showing the device attached to the teeth of the animal; Fig. 2, a vertical sectional view of Fig. 1; Fig. 3, perspective views of the device and its attaching pins and nuts. Fig. 4 shows the device and a modified means for attaching it to the animal's teeth, and Fig. 5 another modification.

The anti-cribbing attachment is composed of a plate, A, of metal or other suitable material sufficiently rigid for the purpose, which is curved in the direction of its length to accurately conform to and fit the outer surface of the upper front teeth. The plate is provided with a substantially-straight upper edge, $a$, which is adapted to rest immediately adjacent to or against the animal's gums, and with a rounded or convex lower edge, $b$, which is adapted to project slightly below the edges of the teeth. The rounded ends of the plate are each provided with a perforation, $c$, through which can be passed a pin, $d$, having a screw-thread, $e$, and a fixed flat head or washer, $f$, made perfectly smooth, especially at its edges.

In attaching the device the pins $d$ are inserted between two adjacent teeth from the inside until their heads or washers $f$ rest against the inner surface of said teeth. The plate A is then placed against the outer surface of the upper front teeth with the pins $d$ projecting through the end perforations, $c$, after which nuts $g$ are screwed upon the projecting ends of the pins and tightened up against the plate. The ends of the pins projecting beyond the nut are severed and all made smooth and even, so as to avoid cutting the animal's mouth. When the plate is thus attached its position should be such that its upper edge rests immediately under or against the animal's gums, and the lower rounded or convex edge projects slightly below the edge of the teeth, as represented in Figs. 1 and 2.

With this attachment properly secured in position, as stated, the animal can freely partake of food; but if it attempts crib-biting or cribbing the lower edge of the plate will come in contact with the manger, and thereby cause the upper edge of said plate to bind, press, or operate on the animal's gums sufficiently to cause it to cease its vicious practice and eventually result in a permanent cure of the habit, due from the pain incident to the act of attempting to bite the crib or manger, all of which I have demonstrated by practical use of the device.

It is preferable to make the heads $f$ of the pins small and round, and interpose between them and the inner surface of the teeth washers $h$.

Instead of employing the screw-threaded pin and nut, as shown in Figs. 1, 2, and 3, the plate may be provided with narrow slits $i$, through which can be passed flat pins $k$, having flat heads $l$ to rest against the inner surface of the teeth, said pins being adapted to pass through the slits and to receive washers

*m*, the projecting ends of the pins being then upset to secure the washers against the plate. The pins, being made flat, can be easily inserted through the spaces between the animal's teeth.

Figure 5:
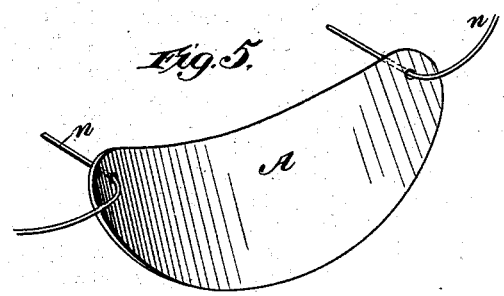

Another mode of attaching the plate to the teeth is shown in Fig. 5, and consists in employing a wire, *n*, secured at or near the ends of the plate and adapted to be tied around a tooth.

The anti-cribbing plate may be composed of celluloid, vulcanized rubber, or any other material sufficiently rigid and substantial to accomplish the purpose, and any suitable device may be employed for securing the plate in position. In some instances the metal may be cut near each end, so as to form two prongs with the points approaching each other, which can then be bent at right angles to the plate, and said prongs be passed between the teeth and then be bent around the tooth, so as to fasten the plate in position.

What I claim is—

1. An anti-cribbing attachment consisting of a curved plate having means for attaching it to the teeth of a horse, substantially as described.

2. An anti-cribbing attachment consisting of a longitudinally-curved plate adapted to rest against the upper front teeth of an animal, and provided with end perforations for receiving fastening devices to attach the plate to the teeth, substantially as described.

In testimony whereof I have hereunto set my hand in the presence of two subscribing witnesses.

OWEN P. DEEDS.

Witnesses:
 HOWARD HONBERGER,
 EDWARD YEAGER.